US007989115B2

(12) United States Patent
Durante et al.

(10) Patent No.: US 7,989,115 B2
(45) Date of Patent: Aug. 2, 2011

(54) HIGHLY STABLE FUEL CELL MEMBRANES AND METHODS OF MAKING THEM

(75) Inventors: Vincent A. Durante, West Chester, PA (US); William E. Delaney, Hockessin, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 829 days.

(21) Appl. No.: 11/956,819

(22) Filed: Dec. 14, 2007

(65) Prior Publication Data

US 2009/0155662 A1    Jun. 18, 2009

(51) Int. Cl.
*H01M 8/10* (2006.01)
*B01D 71/36* (2006.01)
*B01D 69/14* (2006.01)
*C08J 5/22* (2006.01)
*C25B 13/08* (2006.01)

(52) U.S. Cl. ......... 429/479; 429/482; 429/483; 429/492

(58) Field of Classification Search .................. 429/479, 429/482, 483, 491–494; 252/62.2
See application file for complete search history.

(56) References Cited

U.S. PATENT DOCUMENTS

| | | | |
|---|---|---|---|
| 3,953,566 A | 4/1976 | Gore | |
| 4,427,765 A | 1/1984 | Mohr et al. | 430/525 |
| 4,866,099 A | 9/1989 | Hendy | 521/64 |
| 5,814,405 A | 9/1998 | Branca et al. | |
| RE37,301 E | 7/2001 | Lo | |
| RE37,307 E | 8/2001 | Bahar et al. | |
| 6,335,112 B1 | 1/2002 | Asukabe et al. | 429/30 |
| 6,607,856 B2 | 8/2003 | Suzuki et al. | 429/30 |
| 6,613,203 B1 | 9/2003 | Hobson et al. | |
| 6,673,864 B2 | 1/2004 | Patel et al. | 524/494 |
| 6,753,108 B1 | 6/2004 | Hampden-Smith et al. | 429/44 |
| 6,824,909 B2 | 11/2004 | Mathias et al. | 429/33 |
| 7,087,361 B2 | 8/2006 | Sasaki et al. | 430/276.1 |
| 7,112,386 B2 | 9/2006 | Cipollini et al. | 429/41 |
| 2002/0122980 A1 | 9/2002 | Fleischer et al. | 429/213 |
| 2003/0008196 A1 | 1/2003 | Wessel et al. | 4/86 |
| 2003/0059666 A1 | 3/2003 | Kourtakis | 429/40 |
| 2003/0113605 A1 | 6/2003 | Hidaka et al. | 429/33 |
| 2003/0146148 A1 | 8/2003 | Wu et al. | |
| 2004/0028913 A1 | 2/2004 | Hennige et al. | 428/446 |
| 2004/0038105 A1 | 2/2004 | Hennige et al. | 429/33 |
| 2004/0045814 A1 | 3/2004 | Bahar et al. | |
| 2004/0138352 A1 | 7/2004 | Taniguchi et al. | 524/115 |
| 2005/0095355 A1 | 5/2005 | Leistra et al. | 427/40 |
| 2005/0118478 A1 | 6/2005 | Kiefer et al. | 429/40 |
| 2005/0136308 A1 | 6/2005 | Andrews et al. | 429/40 |
| 2005/0170236 A1 | 8/2005 | Watanabe et al. | 429/40 |

(Continued)

FOREIGN PATENT DOCUMENTS

DE    43 33 328    4/1994

(Continued)

OTHER PUBLICATIONS

International Search Report—PCT/US2008/013342 Dated Jul. 27, 2009.

(Continued)

*Primary Examiner* — Gregg Cantelmo

(74) *Attorney, Agent, or Firm* — Allan M. Wheatcraft

(57) ABSTRACT

A solid polymer electrolyte membrane having (a) an ion exchange material and (b) dispersed in said ion exchange material, a hydrogen peroxide decomposition catalyst bound to a carbon particle support, wherein the hydrogen peroxide decomposition catalyst comprises (i) polyvinylphosphonic acid and (ii) cerium.

4 Claims, 8 Drawing Sheets

U.S. PATENT DOCUMENTS

| | | | |
|---|---|---|---|
| 2005/0239938 A1 | 10/2005 | Rule | 524/414 |
| 2005/0260464 A1 | 11/2005 | Raiford et al. | 429/13 |
| 2006/0019140 A1 | 1/2006 | Kawazoe et al. | 429/33 |
| 2006/0063054 A1 | 3/2006 | Frey et al. | 429/33 |
| 2006/0063055 A1 | 3/2006 | Frey et al. | 429/33 |
| 2006/0099475 A1 | 5/2006 | Watanabe et al. | 429/33 |
| 2006/0166073 A1 | 7/2006 | Ohashi | 429/40 |
| 2006/0199063 A1 | 9/2006 | Miura et al. | 429/33 |
| 2006/0257706 A1 | 11/2006 | Hidaka et al. | 429/33 |
| 2007/0031723 A1 | 2/2007 | Mikhail et al. | 429/44 |
| 2007/0072036 A1 | 3/2007 | Berta et al. | 429/33 |
| 2007/0099052 A1 | 5/2007 | Frey et al. | 429/33 |
| 2007/0099053 A1 | 5/2007 | Frey et al. | 429/33 |
| 2007/0104994 A1 | 5/2007 | Endoh et al. | 429/33 |
| 2007/0111076 A1 | 5/2007 | Endoh | 429/33 |
| 2007/0148520 A1 | 6/2007 | Shin et al. | 429/33 |
| 2007/0212593 A1 | 9/2007 | Raiford et al. | 429/44 |
| 2007/0213209 A1 | 9/2007 | Siddiqui | |
| 2007/0237997 A1 | 10/2007 | Kimura et al. | |
| 2007/0238001 A1 | 10/2007 | Koyama | |
| 2007/0287051 A1 | 12/2007 | Onuma et al. | 429/33 |
| 2008/0102338 A1 | 5/2008 | Son et al. | 429/30 |
| 2008/0118806 A1 | 5/2008 | Endoh et al. | 429/33 |
| 2008/0118808 A1 | 5/2008 | Tayanagi et al. | 429/33 |

FOREIGN PATENT DOCUMENTS

| | | |
|---|---|---|
| EP | 1 912 272 A1 | 7/2006 |
| EP | 1 788 650 A1 | 5/2007 |
| GB | 1 534 359 | 12/1978 |
| JP | 6-103992 | 4/1994 |
| JP | 2001-118591 A | 4/2001 |
| JP | 2003-77492 A | 3/2003 |
| JP | 2003-123777 A | 4/2003 |
| JP | 2004-134269 A | 4/2004 |
| JP | 2004-152615 A | 5/2004 |
| JP | 2004-327074 A | 11/2004 |
| JP | 2004-327141 A | 11/2004 |
| JP | 2005-019232 | 1/2005 |
| JP | 2005-063713 | 3/2005 |
| JP | 2005-190752 | 7/2005 |
| JP | 2005-235437 | 9/2005 |
| JP | 2005-317238 | 11/2005 |
| JP | 2006-049263 | 2/2006 |
| JP | 2006-99999 A | 4/2006 |
| JP | 2006-107914 A | 4/2006 |
| JP | 2006-107967 | 4/2006 |
| JP | 2006-134678 | 5/2006 |
| JP | 2006-269183 | 5/2006 |
| JP | 2006-244782 A | 9/2006 |
| JP | 2006-261004 | 9/2006 |
| JP | 2006-269357 | 10/2006 |
| JP | 2006-294293 | 10/2006 |
| JP | 2006-313710 | 11/2006 |
| JP | 2007-066882 | 3/2007 |
| JP | 2007-073303 | 3/2007 |
| WO | WO2006/006502 A1 | 1/2006 |
| WO | WO 2007/001096 A1 | 1/2007 |
| WO | WO 2007/050084 A1 | 5/2007 |
| WO | WO 2007/113589 A1 | 10/2007 |

OTHER PUBLICATIONS

Edwards, J. O. & Curci, R. 1992, "Fenton Type Activation and Chemistry of Hydroxyl Radical," in *Catalytic Oxidations with Hydrogen Peroxide as Oxidant*, G. Strukul, ed., Kluwer Academic Publishers, Dordrecht, Netherlands, pp. 97-151.

HIGHLY STABLE FUEL CELL MEMBRANES AND METHODS OF MAKING THEM

FIELD OF THE INVENTION

The present invention relates to highly stable membranes for use in polymer electrolyte membrane fuel cells and methods of making same.

BACKGROUND OF THE INVENTION

Fuel cells are devices that convert fluid streams containing a fuel (for example, hydrogen) and an oxidizing species (for example, oxygen or air) to electricity, heat, and reaction products. Such devices comprise an anode, where the fuel is provided, a cathode, where the oxidizing species is provided, and an electrolyte separating the two. As used herein, the term "catalyst coated membrane" means a combination of an electrolyte and at least one electrode. The fuel and oxidant are typically liquid or gaseous materials. The electrolyte is an electronic insulator that separates the fuel and oxidant. It provides an ionic pathway for the ions to move between the anode, where the ions are produced by reaction of the fuel, to the cathode, where they are used to produce the product. The electrons produced during formation of the ions are used in an external circuit, thus producing electricity. As used herein, fuel cells may include a single cell comprising only one anode, one cathode and an electrolyte interposed therebetween, or multiple cells assembled in a stack. In the latter case there are multiple separate anode and cathode areas wherein each anode and cathode area is separated by an electrolyte. The individual anode and cathode areas in such a stack are each fed fuel and oxidant, respectively, and may be connected in any combination of series or parallel external connections to provide power.

Additional components in a single cell or in a fuel cell stack may optionally include means to distribute the reactants across the anode and cathode, including, but not limited to porous gas diffusion media. Various sealing materials used to prohibit mixing of the various species may also be used. As used herein, the membrane electrode assembly (MEA) comprises the catalyst coated membrane and such gas diffusion media and sealing materials. Additionally, so-called bipolar plates, which are plates with channels to distribute the reactant may also be present.

A Polymer Electrolyte Membrane Fuel Cell (PEMFC) is a type of fuel cell where the electrolyte is a polymer electrolyte. Other types of fuel cells include Solid Oxide Fuel Cells (SOFC), Molten Carbonate Fuel Cells (MCFC), Phosphoric Acid Fuel Cells (PAFC), etc. As with any electrochemical device that operates using fluid reactants, unique challenges exist for achieving both high performance and long operating times. In order to achieve high performance it is necessary to reduce the electrical and ionic resistance of components within the device. Recent advances in the polymer electrolyte membranes have enabled significant improvements in the power density of PEMFCs. Steady progress has been made in various other aspects including lowering Pt loading, extending membrane life, and achieving high performance at different operating conditions. However, many technical challenges are still ahead. One of them is for the membrane electrode assembly to meet the lifetime requirements for various potential applications. These range from hundreds of hours for portable applications to 5,000 hours or longer for automotive applications to 40,000 hours or longer in stationary applications.

Although all of the materials in the fuel cell may be subject to degradation during operation, the integrity and health of the membrane is particularly important. Should the membrane degrade during fuel cell operation, it tends to become thinner and weaker, thus making it more likely to develop holes or tears. Should this occur, the oxidizing gas and fuel may mix internally potentially leading to internal reaction. Because such an internal reactions may ultimately cause damage to the entire system, the fuel cell must be shut down. One well known approach to assessing the health of fluorinated membranes is to measure the amount of fluoride ions in the product water of the fuel cell. Higher values of this so-called fluoride release rate are indicative of more attack of the membrane, and therefore are associated with membranes that have lower durability. Correspondingly, lower fluoride release rates are indicative of a healthier membrane, one more likely to have longer life.

As is well known in the art, decreasing the thickness of the polymer electrolyte membrane can reduce the membrane ionic resistance, thus increasing fuel cell power density. However, reducing the membranes physical thickness can increase the susceptibility to damage from other device components leading to shorter cell lifetimes. Various improvements have been developed to mitigate this problem. For example, U.S. Pat. No. RE 37,307, U.S. Pat. No. RE37,701, US Application No. 2004/0045814 to Bahar et al., and U.S. Pat. No. 6,613,203 to Hobson, et. al. show that a polymer electrolyte membrane reinforced with a fully impregnated microporous membrane has advantageous mechanical properties. Although this approach is successful in improving cell performance and increasing lifetimes, it does not address mechanisms involving chemical attack of the membrane by highly oxidizing species present during fuel cell operation. These include, for example, various radical species such as peroxide and hydroxide radicals that can attack and degrade the ionomer. Thus, the mechanical reinforcement in '307 and the like is a necessary, but generally not totally sufficient, condition for longer life.

The performance of a fuel cell over time is known as fuel cell durability, or fuel cell stability. During normal operation of a fuel cell, the power density typically decreases as the operation time increases. This decrease, described by practitioners as voltage decay, is not desirable because less useful work is obtained as the cell ages during use. Ultimately, the cell or stack will eventually produce so little power that it is no longer useful at all. Furthermore, during operation the amount of fuel, for example, hydrogen, that crosses over from the fuel side to the oxidizing side of the cell will increase as the health of the membrane deteriorates. Hydrogen cross-over is thus used as one measure of membrane life.

A life test is generally performed under a given set of operating conditions for a fixed period of time. The test is performed under a known temperature, relative humidity, flow rate and pressure of inlet gases. In the present application, life tests are performed under open circuit conditions because these are known in the art to give the most accelerated membrane degradation. Thus, if a membrane has limited or no degradation during an open circuit voltage hold, it can be expected to last a much longer time when used in an actual fuel cell under load.

As mentioned above, hydrogen cross-over and fluoride release rate are typically used to determine the extent of degradation, and thereby life, of a fuel cell. For hydrogen cross-over, the amount of hydrogen that crosses over from one side of the membrane to the other is measured after at various times during a life-test. If the hydrogen cross-over is above some predetermined level, 2.5 cm$^3$ H$_2$/min is used herein, then the test is ended, and the life is calculated as the number of hours the cell has operated. Fluoride release rate (FRR) measures degradation products that leave the cell in the product water during a life test. For fluorocarbon membranes, the amount of fluoride ions in the water can be measured, and the rate of production of them is calculated as a fluoride release rate. The lower this number, the less degradation and therefore the longer the membrane will survive, at least assuming the degradation is uniform in the membrane. (Specific details of the test protocol used herein for life determination are described below).

Although there have been many improvements to fuel cells in an effort to improve life of fuel cells, there continues to be an unmet need for even more durable fuel cells, and in particular, more durable membrane materials for use in PEMFCs.

SUMMARY OF THE INVENTION

The present invention provides compound for increasing the durability of a fuel cell membrane. The compound includes an organic polymer including a monomer with at least two carbon atoms and at least one moiety comprising phosphorous, and a metal that is a transition metal with multiple oxidation states or a lanthanide metal with multiple oxidation states. Preferably, the organic polymer is polyvinylphosphonic acid (PVPA). Also preferably, the organic polymer is a noncrystalline polymer insoluble in strong acid. The metal is preferably cerium. Preferably, the compound is bound to a support particle which is preferably carbon, but in alternative embodiments is alumina or silica or zeolite. The inventive compound is a composition of matter comprising the reaction product of PVPA, cerium (III) nitrate hexahydrate, and water. Alternatively, the invention is a composition of matter comprising the reaction product of carbon black, PVPA, $Ce(NO_3)_3 6H_2O$, and water.

In another aspect, the invention provides a membrane including the compound described herein. The inventive solid polymer electrolyte of this aspect of the invention includes (a) an ion exchange material and (b) dispersed in said ion exchange material, a hydrogen peroxide decomposition catalyst bound to a carbon particle support, wherein the hydrogen peroxide decomposition catalyst comprises (i) polyvinylphosphonic acid and (ii) cerium. Preferably, the solid polymer electrolyte membrane further includes expanded polytetrafluoroethylene having a porous microstructure of polymeric fibrils, and the ion exchange material impregnated throughout the porous microstructure of the expanded PTFE membrane so as to render an interior volume of the expanded PTFE membrane substantially occlusive. Also preferably, the solid polymer electrolyte membrane includes a first layer comprising (a) at least one expanded PTFE membrane having a porous microstructure of polymeric fibrils, and (b) at least one ion exchange material impregnated throughout the porous microstructure of the expanded PTFE membrane so as to render an interior volume of the expanded PTFE membrane substantially occlusive, and a second layer comprising ion exchange material in the absence of an expanded PTFE membrane. The second layer preferably includes the peroxide decomposition catalyst.

In another aspect, the invention provides an electrode including the compound described herein. The inventive electrode of this embodiment includes (a) an ion exchange material; (b) an organic polymer including a monomer with at least two carbon atoms and at least one moiety including phosphorous, (c) a metal including a transition metal with multiple oxidation states or a lanthanide metal with multiple oxidation states, and (d) a catalyst for either fuel oxidation or oxygen reduction.

In another aspect, the invention provides a catalyst coated membrane including the compound described herein. The inventive catalyst coated membrane of this embodiment includes (a) at least one electrode capable of oxidizing a fuel or reducing an oxidant, (b) a solid polymer electrolyte attached to the electrode wherein the solid polymer electrolyte or electrode includes an (1) ion exchange material and (2) a peroxide decomposition catalyst, wherein the peroxide decomposition catalyst comprises an organic polymer comprising at least two carbon atoms and at least one a moiety comprising phosphorous, and (ii) a metal comprising a transition metal with multiple oxidation states or a lanthanide metal with multiple oxidation states.

In another aspect, the invention provides a fuel cell including the compound described herein. The inventive fuel cell of this embodiment includes (a) an anode comprising a catalyst for oxidizing fuel, (b) a cathode comprising a catalyst for reducing an oxidant, and (c) a solid polymer electrolyte;

wherein at least one of the solid polymer electrolyte, the anode and the cathode comprises a peroxide decomposition catalyst comprising an organic polymer comprising at least two carbon atoms and a moiety comprising phosphorous, and (ii) a metal comprising a transition metal with multiple oxidation states or a lanthanide metal with multiple oxidation states.

(d) a fuel supplied to the anode;

(e) an oxidant supplied to the cathode.

In another aspect, the invention provides various methods to prepare the inventive compounds, SPEM, electrodes, CCMs and fuel cells. One such embodiment is a method to make a compound comprising the steps of (1) preparing an organic polymer comprising at least two carbon atoms in solution;

(2) adding a salt of a metal selected from the group of transition metals and lanthanides that have multiple oxidation states, (3) precipitating said compound.

The method may further comprise a step 1A after step 1 wherein a support particle is added to said solution; additional step or steps after step 3 to separate the compound, to purify the compound, for example by acid washing, and to dry the compound.

Further embodiments of the invention are methods such as those described above where a support particle is also added in step 1, where the support particle may include, but is not limited to alumina, silica, zeolite and carbon. Additionally, the solution used in step 1 may comprise an ion exchange material. Further embodiments of the inventive method include steps in addition to those described above to prepare an electrode comprising the compound, or preparing a SPEM comprising the compound, or preparing a CCM where the compound is present in one or more of the electrodes and membrane.

DESCRIPTION OF THE DRAWINGS

The operation of the present invention should become apparent from the following description when considered in conjunction with the accompanying figure.

DETAILED DESCRIPTION OF THE INVENTION

Inventors have discovered compounds, which when used as a component in solid polymer electrolyte (SPE) membranes, in electrodes, or in catalyst coated membranes in fuel cells, surprisingly significantly reduce membrane degradation and give a concomitant increase in membrane life. The inventive compounds are catalysts capable of peroxide decomposition and are formed of a metal, preferably cerium, and an organic polymer made from a monomer having at least 2 carbon atoms, preferably PVPA, bound to the support particles. When used as a component in a composite membrane, the combination of the low levels of supported peroxide decomposition catalyst and the phosphorous containing compound that binds the peroxide decomposition catalyst to the support yields a very stable membrane that has surprisingly very long life when used in a PEMFC. Furthermore, the inventive compositions do so at surprisingly low transition metal levels (<1 wt. percent), and quite unexpectedly, largely without the deleterious effects of loss of power density and transient power effects often associated with prior art using the addition of transition metals or transition metal compounds to the membrane. Various embodiments of the inventive SPEs are described below.

Figure 1:
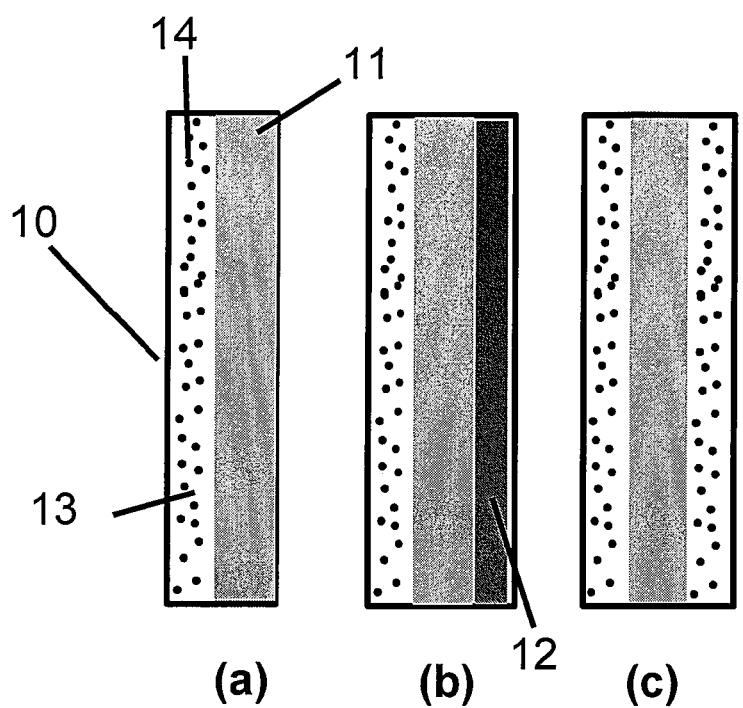
FIG. 1 is a drawing illustrating several embodiments of the inventive solid polymer electrolytes.

FIG. 1 shows a schematic of a three different embodiments of the inventive solid polymer electrolyte 10. SPE 10 typically is thin, less than 100 microns, preferably less than 75 microns, and most preferably less than 40 microns thick. It comprises an ion exchange material 11 that is able to conduct hydrogen ions at a high rate in typical fuel cell conditions. The ion exchange materials may include, but are not limited to compositions comprising phenol sulfonic acid; polystyrene sulfonic acid; fluorinated-styrene sulfonic acid; perfluorinated sulfonic acid; sulfonated Poly(aryl ether ketones); polymers comprising phthalazinone and a phenol group, and at least one sulfonated aromatic compound; aromatic ethers, imides, aromatic imides, hydrocarbon, or perfluorinated polymers in which ionic an acid functional group or groups is attached to the polymer backbone. Such ionic acid functional groups may include, but are not limited to, sulfonic, sulfonimide or phosphonic acid groups. Additionally, the ion exchange material 11 may further optionally comprise a reinforcement to form a composite membrane. Preferably, the reinforcement is a polymeric material. The polymer is preferably a microporous membrane having a porous microstructure of polymeric fibrils, and optionally nodes. Such polymer is preferably expanded polytetrafluoroethylene, but may alternatively comprise a polyolefin, including but not limited to polyethylene and polypropylene. An ion exchange material is impregnated throughout the membrane, wherein the ion exchange material substantially impregnates the microporous membrane to render an interior volume of the membrane substantially occlusive, substantially as described in Bahar et al, RE37,307, thereby forming the composite membrane.

The SPE 10 of FIG. 1 also comprises a plurality of particles 14 supporting a peroxide decomposition catalyst, preferably a compound of cerium and PVPA. Particles 14 are dispersed in a substantially air occlusive, electronically insulating ionomer layer 13 adjacent to the surface of ion exchange material 11. A plurality of the particles 14 preferably have a size less than about 75 nm, or preferably less than about 50 nm. The peroxide decomposition catalyst is bound to the particles. Although PVPA is preferred, other organic polymers comprising phosphorus are contemplated according to this invention. Preferably, the organic polymer is substantially insoluble in the acid environment of the ionomer membrane. In alternative embodiments, the compound includes organic dihydrogen phosphonate compounds, polystyrenephosphonic acid, poly-alpha, beta, beta-trifluorostyrenephosphonic acid, or polyvinylbenzyl phosphonic acid. Using the inventive composition, the peroxide decomposition catalyst appears to be substantially immobile during fuel cell operation, as may be demonstrated by electron microprobe analysis. In other words, the metal or metal ions associated with the peroxide decomposition catalyst do not substantially dissolve or move within the membrane during fuel cell operation. By so doing, any reduction in power density during fuel cell operation or other transient effects observed in prior art that uses unsupported, or unbound, catalyst compounds or catalyst ions (e.g., Ce or Mn, or compounds thereof) is avoided. Furthermore, the complexing of the metal such as cerium with the polymer such as PVPA changes the reduction potential of the cerium, such that it is a more effective peroxide decomposition catalyst.

Such particles 14 may be agglomerated together in groups of two, three or even in larger groupings of many particles, though it is preferable that they are separated in smaller clusters of a few particles, and most preferably, as individual particles. Layer 13 may be only on one side of the ion exchange material 11 (FIG. 1a and 1b) or on both sides (FIG. 1c). Preferably, it is used on the side facing the cathode (not shown). Optionally, a second ion exchange material 12 may also be present (FIG. 1b) on the side opposite layer 13. The composition of ion exchange material 12 may be the same as ion exchange material 11, or it may be of a different composition. Similarly. layer 13 may be the same ion exchange material as ion exchange material 11, or it may be a different composition. The peroxide decomposition catalyst may include any non-precious metal catalyst known in the art that is capable of catalyzing peroxide decomposition. Preferred peroxide decomposition catalysts include metals that decompose hydrogen peroxide to water in acid conditions with either limited or no release of radical species that could potentially initiate polymer decomposition. These include, but are not limited to, metal and metal oxide ions, or other species containing cations of transition metals or lanthanides that have multiple oxidation states and are not electrochemically too active. Such materials may include, but are not limited to, Ti, VO, Cr, Mn, Fe, Co, Cu, Ag, Eu, Pr, Tb and Ce. [see for example, Table 9, pg. 123 in Stukul, Giorgio, in chapter 6, "Nucleophilic and Electrophilic Catalysis with Transition Metal Complexes" of Catalytic Oxidations with Hydrogen Peroxide as Oxidant, Stukul, Giorgio (ed.), Kluwer Academic Press, Dordrecht, Netherlands, 1992]. Of these, however, as shown in the experimental results below, cerium has shown the most surprising results.

Figure 2:
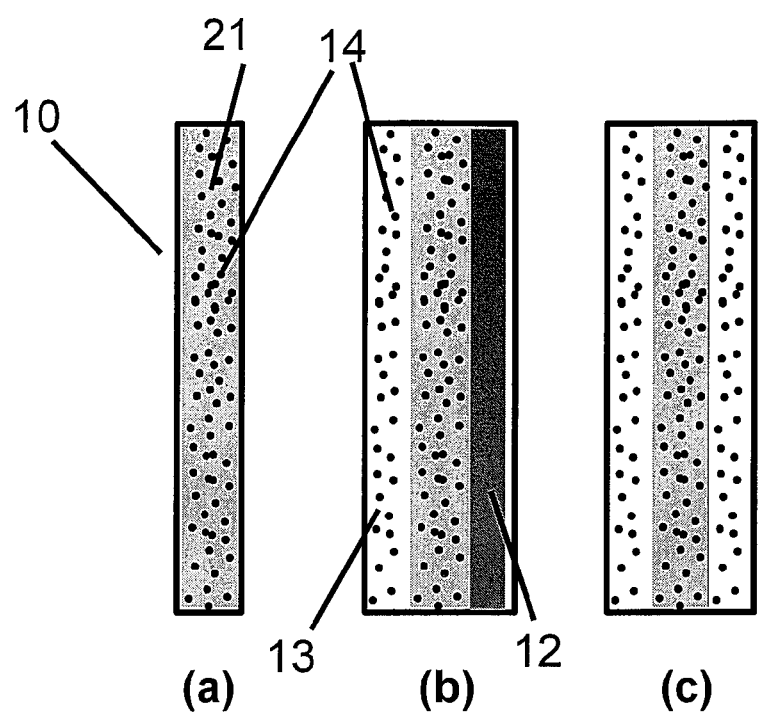
FIG. 2 is a drawing illustrating additional embodiments of the inventive solid polymer electrolytes.
Figure 3:
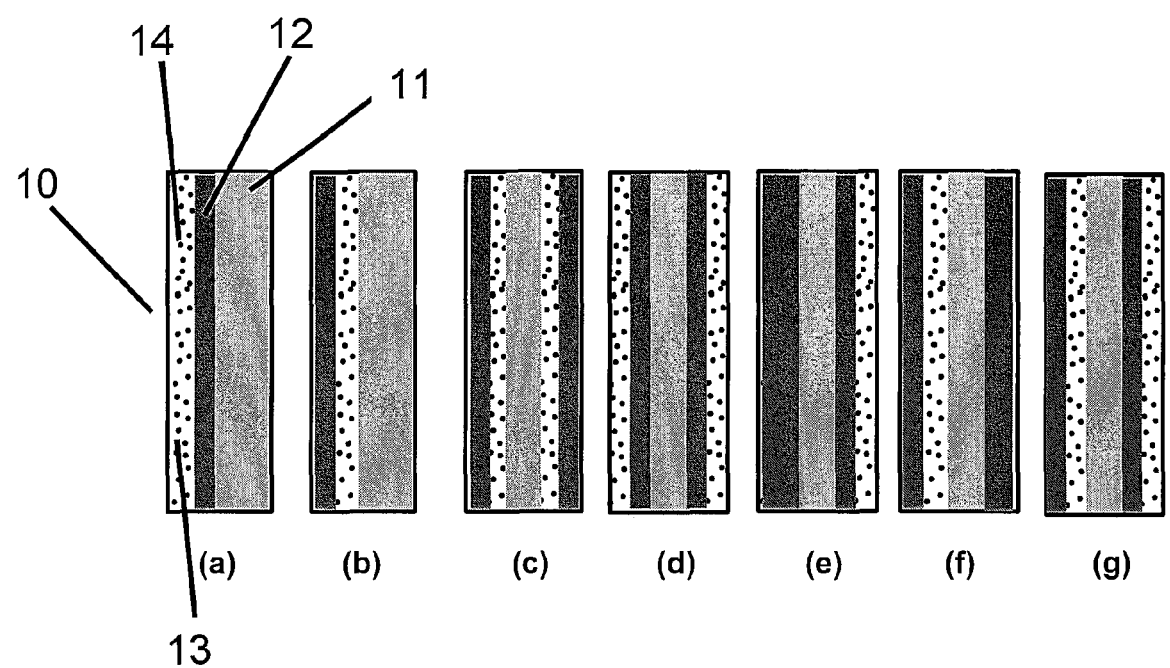
FIG. 3 is a drawing illustrating further embodiments of the inventive solid polymer electrolytes.
Figure 4:
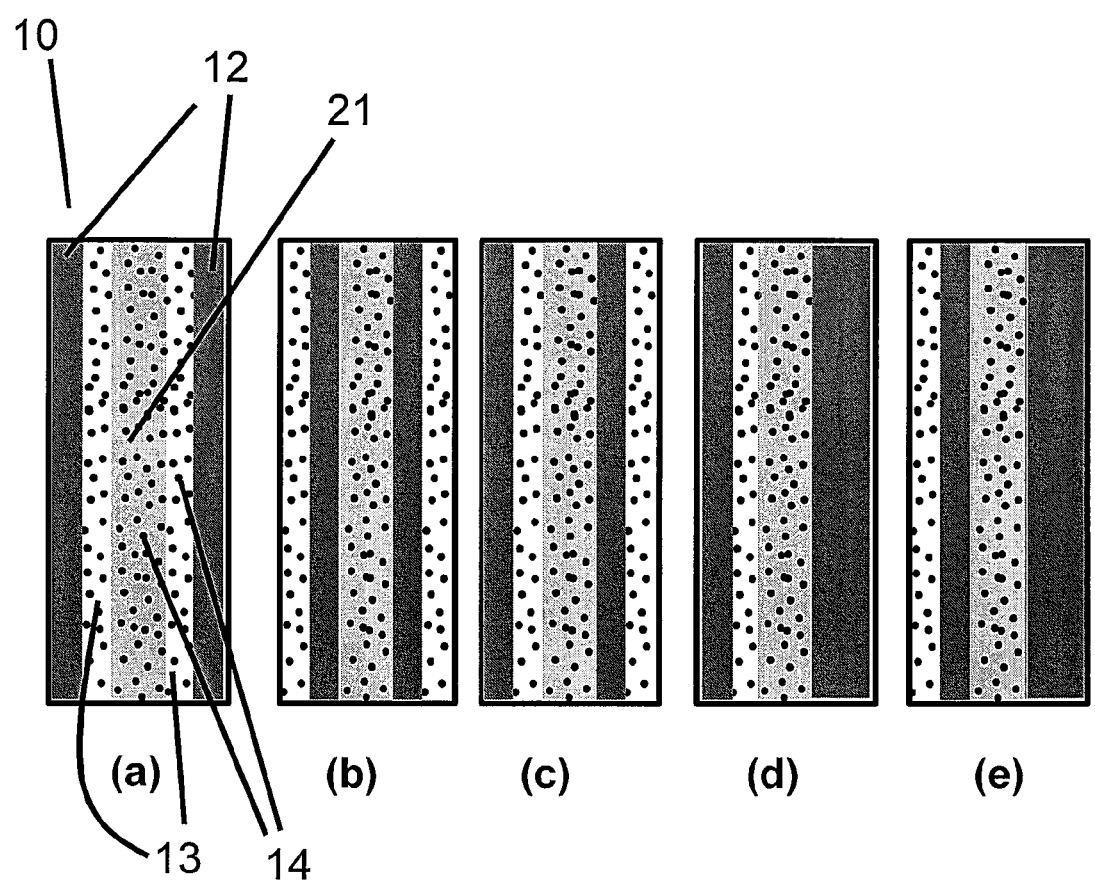
FIG. 4 is a drawing illustrating yet additional embodiment of the inventive solid polymer electrolytes.

FIGS. 2-4 schematically illustrate alternative approaches for the inventive solid polymer electrolyte. In FIG. 2, the solid polymer electrolyte 10 has a plurality of particles 14 supporting a peroxide decomposition catalyst within a composite membrane 21 having an expanded PTFE membrane having a porous microstructure of polymeric fibrils, and ion exchange material impregnated throughout the porous microstructure of the expanded PTFE membrane so as to render an interior volume of the expanded PTFE membrane substantially occlusive. Additionally, a substantially air occlusive, electronically insulating layer 13 may be adjacent to one (FIG. 2b) or both (FIG. 2c) surfaces. Optionally, a second ion exchange material 12 of the same, or of a different composition than used in 21 may also be present (FIG. 1b) on the side opposite layer 13. Alternatively, ion exchange material 11, ion exchange material 12, composite membrane 21, and substantially air occlusive, electronically insulating ionomer layer 13 may also be present in various alternating arrangements, some examples of which are schematically in FIG. 3a-FIG. 3g and FIG. 4a-FIG. 4e. As described above, the peroxide decomposition catalyst is bound to the particles by the compound comprising phosphorus.

The particles 14 shown schematically in FIGS. 1-4 comprise a support material onto which catalyst has been deposited. The support material may comprise silica; zeolites; carbon; and oxides and carbides of the group IVB, VB, VIB VIIB, and VIII transition metals; and combinations thereof. Carbon is a particularly preferable support material. They preferably have high surface area, and so should be small in size, less than 75 nm, or preferably less than 50 nm, or less than 25 nm. They may also optionally be porous. The use of high surface area supports is particularly advantageous because it allows the peroxide decomposition catalyst to be highly dispersed, leading to higher catalytic activity per unit weight compared with an unsupported, lower surface area catalysts of the same composition.

An inventive method for preparing an air occlusive integral composite membrane has also been discovered. The method comprises the steps of (a) preparing a peroxide decomposition catalyst bound to a support particle with a compound comprising phosphorus; (b) preparing an ink solution comprising the species from part (a) and an ion exchange material; (c) providing a polymeric support having a microstructure of micropores; (d) applying either the ink solution or a solution comprising an ion exchange resin to the polymeric support; (e) optionally, repeating step (d); wherein at least one application in step (d) or (e) uses the ink solution. In this application, an ink is considered to be a solution containing a catalyst on a supporting particle that is dispersed in a solvent. The ink solution preferably also contains an ion exchange polymer. Solvents used in the ink are those generally known in the art, including but not limited to alcohols, such as ethanol and propanol, or other organic solvents. The preparation of the ink solution preferably uses a high shear mixer, where the high shear mixer may include, but is not limited to, microfluidizers, and rotor-stator mixers comprising at least one stage. Particularly preferable high shear mixers are microfluidizers capable of operating at pressures between 5.000 psi and 25,000 psi. The ink is preferably very well mixed, which may be accomplished by one, two, three or more passes through the high shear mixer. The concentration of the peroxide decomposition catalyst in the ink is between about 0.01% and about 3% by dry weight of the ion exchange material, and preferably less than 1%, more preferably between about 0.01% and about 0.5%, and most preferably about 0.2%. This ink may be prepared in one, two or more separate steps if desired. If it is prepared in two or more steps, a more concentrated solution is made in the first step, and subsequent steps are dilutions with ion exchange material and/or solvent to arrive at the final desired concentration. When more than one step of preparing the ink is used, the high shear mixing step described above may be used in one or more of the ink preparation steps. If desired, the first step in a multi-step ink preparation process may be accomplished in advance of the succeeding steps, in which case the ink may be stored for a period of time. If such a concentrated ink is stored for longer than about 30-60 minutes, then the high shear mixing step is preferably repeated at least once, and more preferably two or three times before any subsequent dilution steps needed to arrive at the final ink used for subsequent processing.

Additional steps to remove large agglomerates in the ink solution may also be performed, if desired, at any stage during the ink preparation. Such steps may include, but are not limited to, filtering and using a centrifuge. In either case, the number of large particles removed can be controlled. In the former, by the particular filter chosen; in the latter, by the length of time the sample is centrifuged, and/or the speed of the centrifuge. The centrifuge speed may be varied from between a few hundred rpm, to many thousand rpm, with the higher speeds being preferable. The time to centrifuge may vary from a few minutes to an hour or longer. Shorter times at higher speeds, for example less than 30 minutes at 3000-5000 rpm, are preferable to reduce processing times.

In a further embodiment of the method, an additional step prior to step (a) may be included, where such step or steps comprise cleaning one or more of the components used in the method to remove impurities. Such impurities may degrade the performance of either the ionomer, or the catalyst in the electrode, or the peroxide decomposition catalyst. The cleaning steps may include, but are not limited to washing with hot or cold water, hot or cold acids, sohxlet extractions, heat treatments in appropriately chosen gas atmospheres, or other chemical treatments known in the are that will remove potentially detrimental impurities. For example, a hot acid wash has been found to be preferably when PVPA is used as the compound comprising phosphorus.

The ion exchange material in the ink may be any known in the art, for example those described above for ion exchange material 11. The peroxide decomposition catalyst on a supporting particle may be any of those described above. The compound comprising phosphorus used to bind the catalyst to the support particle may be any of those described above.

The polymeric support having a microstructure of micropores, may be any such material known in the art, including but not limited to microporous polyethylene, polypropylene or polytetrafluoroethylene. A particularly preferable polymeric support is expanded PTFE, such as those described in U.S. Pat. No. 3,953,566 to Gore, or in U.S. Pat. No. 5,814,405 to Branca, et. al.

Figure 5:
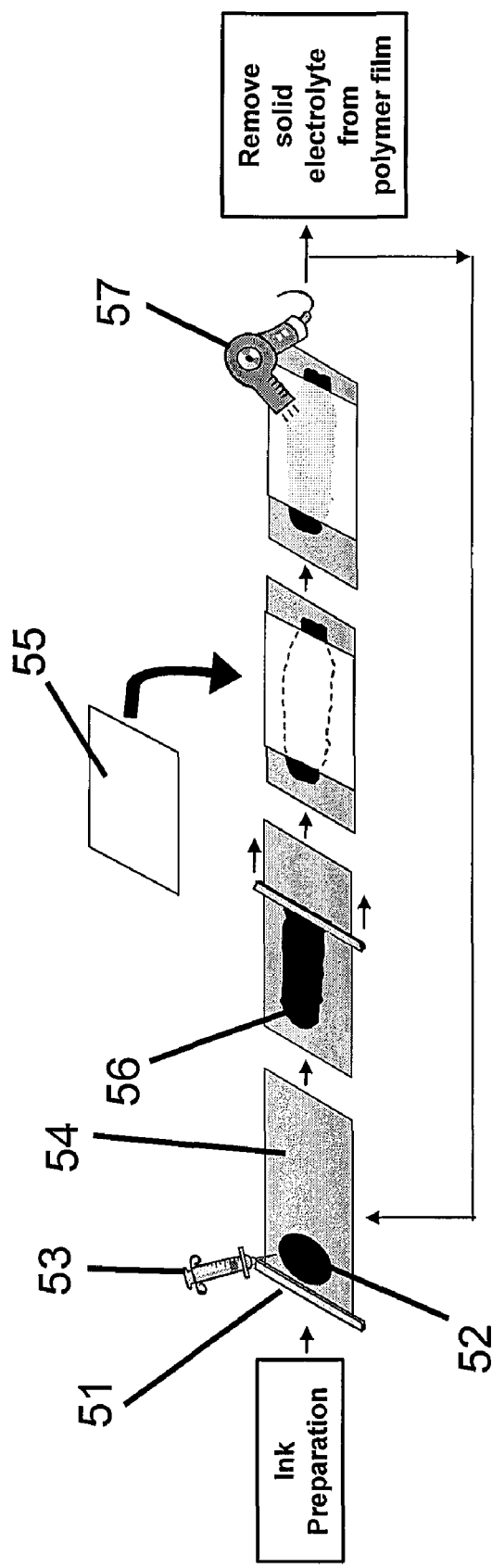
FIG. 5 schematically illustrates an embodiment of the inventive method for preparing the inventive solid polymer electrolytes.

The ink solution or a solution comprising an ion exchange resin may be applied to the polymeric support using any process known in the art, including but not limited to the process described in U.S. Pat. No. RE37,707 to Bahar et. al. Another embodiment of the method of the invention for applying the ink to the polymeric support is shown in FIG. 5. In this embodiment, an ink is applied to a thin polymer film 54 using any means known to one of ordinary skill in the art, for example using a pump, syringe 53 or such. The ink is prepared as described above, so may be prepared in a multistep process starting with a concentrated ink that is subsequently diluted, or directly in one step to obtain the desired catalyst concentration in the ink. The applied ink 52 is then spread into a thin layer 56 using any means known in the art for making a thin liquid layer, including but not limited to a draw bar or meyer bar, shown schematically in FIG. 5 as 51. Subsequently, the polymeric support 55 having a microstructure of micropores is placed on the liquid layer 56 and allowed to imbibe. The thin polymer film 54 comprises polyethylene, polyethylene terephthalate polypropylene, poly vinylidene chloride, polytetrafluoroethylene, polyesters, or combinations thereof, and may further comprise a coating of a release material, for example a fluoropolymer compound, to enhance the release of the final product from the polymer film. After the film is completely imbibed, it is allowed to dry, and may optionally be heated to decrease the drying time. Such heating, shown schematically in FIG. 5 as 57, may be accomplished with any means known in the art, including but not limited to forced air heaters, ovens, infrared driers and the like. The process may be repeated if desired, using the same or a different ink, or the same or a different ion exchange resin.

When the imbibing steps are completed, an additional heating step at an elevated temperature may optionally be applied using an oven, infrared heater, forced air heater or the like. The temperature of this heating step is between about 100° C. and about 175° C. and preferably between about 120 degrees C. and about 160° C. The solid polymer electrolyte is held at the elevated temperature for between about 1 minute and about 10 minutes, and preferably for between about 1 minutes and about 3 minutes. Finally, the completed solid polymer electrolyte membrane is cooled, and removed from the thin polymer film before use. The removal may be accomplished by simply pulling the SPE off the thin polymer film, either in air or in water.

As is well understood by one of ordinary skill in the art, the process described above and in FIG. 5 can by automated using roll goods, and automated pay-off and collection systems so that each step is accomplished in a continuous fashion, and the final product is a roll of solid polymer electrolyte supported on a thin polymer film.

Figure 6:
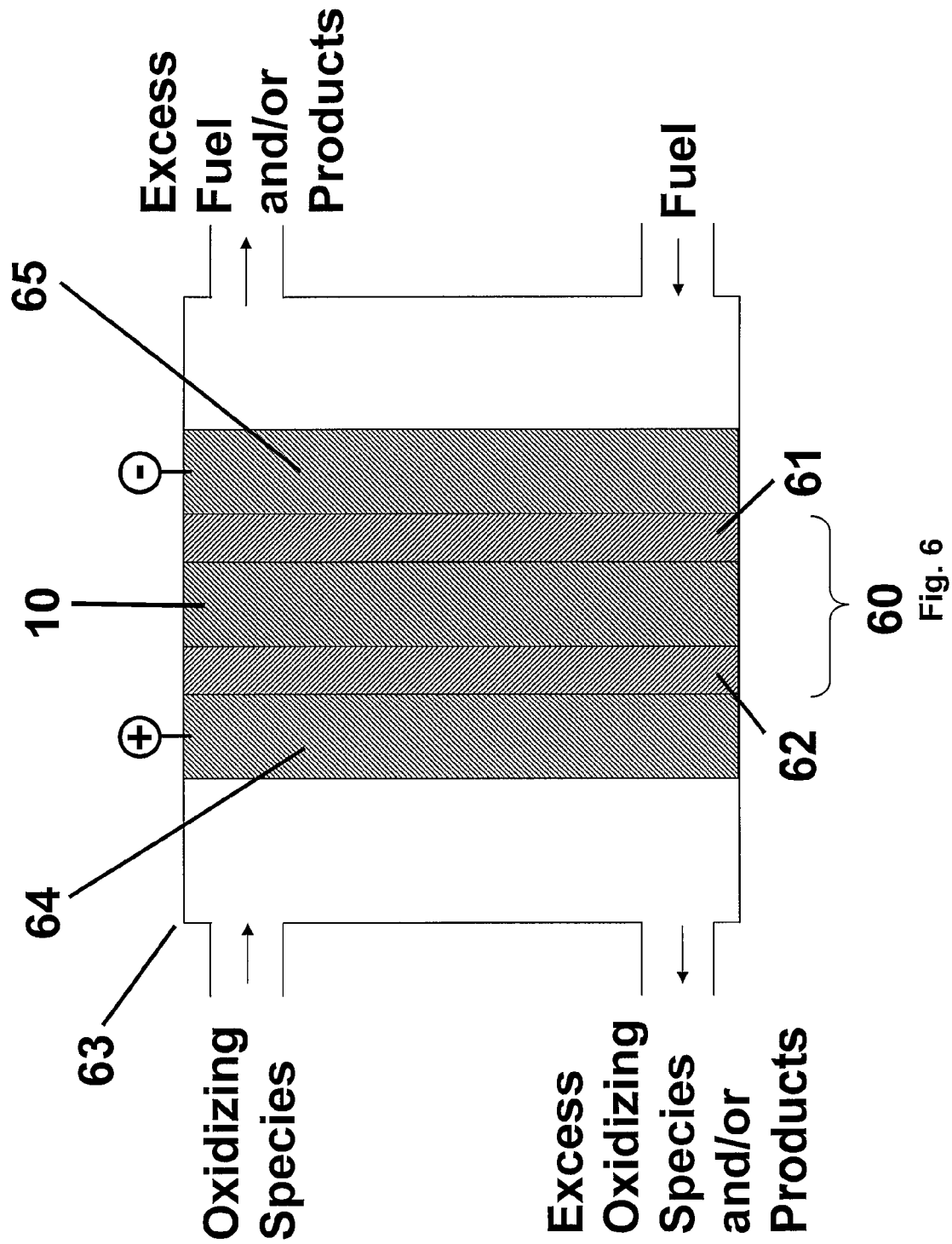
FIG. 6 is a drawing of a fuel cell that uses the inventive solid polymer electrolyte.

The solid polymer electrolyte of the instant invention may also be used to form a catalyst coated membrane (CCM) using any methods known in the art. In FIG. 6, the CCM 60 comprises an anode 61 of a catalyst for oxidizing fuel, a cathode 62 for reducing an oxidant, and the solid polymer electrolyte 10 described above interposed between the anode and cathode, on a supporting particle, or directly on the SPE, or from a catalyst-containing ink solution containing the catalysts that is deposited either directly on the SPE, or on a film that is subsequently used in a lamination step to transfer the electrode to the SPE.

The anode and cathode electrodes comprise appropriate catalysts that promote the oxidation of fuel (e.g., hydrogen) and the reduction of the oxidant (e.g., oxygen or air), respectively. For example, for PEM fuel cells, anode and cathode catalysts may include, but are not limited to, pure noble metals, for example Pt, Pd or Au; as well as binary, ternary or more complex alloys comprising the noble metals and one or more transition metals selected from the group Ti, V, Cr, Mn, Fe, Co, Ni, Cu, Zn, Y, Zr, Nb, Mo, Ru, Rh, Ag, Cd, In, Sn, Sb, La, Hf, Ta, W, Re, Os, Ir, Tl, Pb and Bi. Pure Pt is particularly preferred for the anode when using pure hydrogen as the fuel. Pt—Ru alloys are preferred catalysts when using reformed gases as the fuel. Pure Pt is a preferred catalyst for the cathode in PEMFCs. The anode and cathode may also, optionally, include additional components that enhance the fuel cell operation. These include, but are not limited to, an electronic conductor, for example carbon, and an ionic conductor, for example a perfluorosulfonic acid based polymer or other appropriate ion exchange resin. Additionally, the electrodes are typically porous as well, to allow gas access to the catalyst present in the structure.

Figure 7:
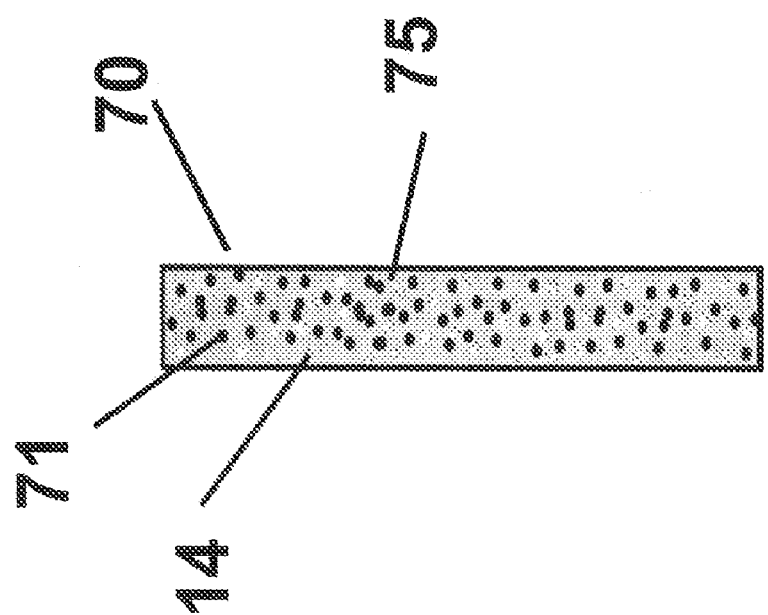
FIG. 7 is another embodiment of the invention of an inventive electrode for use in a solid polymer electrolyte fuel cell.
Figure 8:
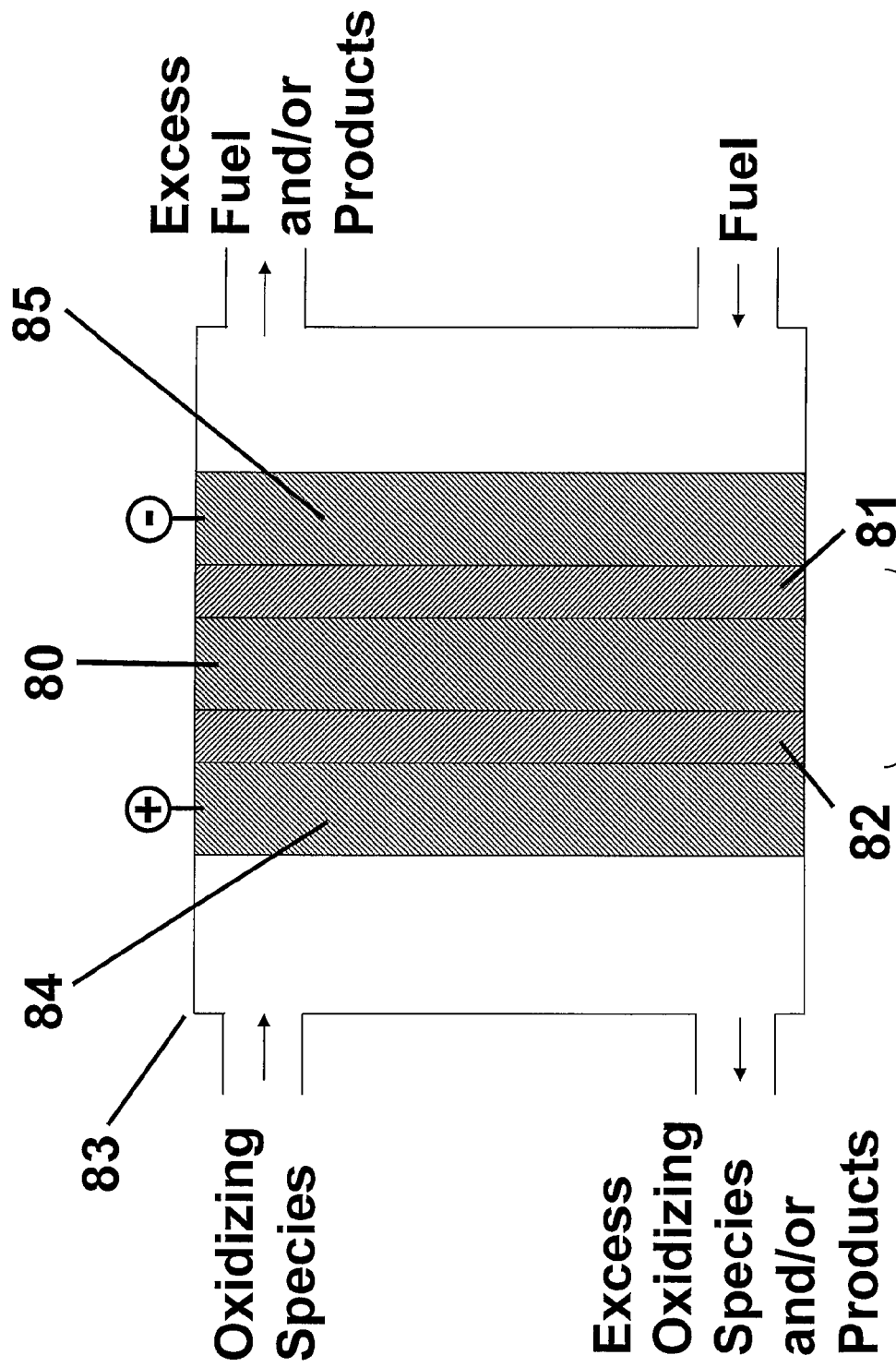
FIG. 8 is a drawing of a fuel cell that uses another embodiment of the inventive solid polymer electrolyte.

A fuel cell 63 can also be formed from the instant invention. As shown in FIG. 6, such PEM fuel cells 63 comprise the CCM 60 and may optionally also include gas diffusion layers 64 and 65 on the cathode 62 and anode 61 sides, respectively. These GDM function to more efficiently disperse the fuel and oxidant. The fuel cell may optionally comprise plates (not shown in FIG. 7) containing grooves or other means to more efficiently distribute the gases to the gas diffusion layers. As is known in the art, the gas diffusion layers 64 and 65 may optionally comprise a macroporous diffusion layer as well as a microporous diffusion layer. Microporous diffusion layers known in the art include coatings comprising carbon and optionally PTFE, as well as free standing microporous layers comprising carbon and ePTFE, for example CARBEL® MP gas diffusion media available from W. L. Gore & Associates. The fluids used as fuel and oxidant may comprise either a gas or liquid. Gaseous fuel and oxidant are preferable, and a particularly preferable fuel comprises hydrogen. A particularly preferable oxidant comprises oxygen.

Another embodiment of the invention (illustrated in FIG. 7) is an electrode 70 for use in a solid polymer electrolyte fuel cell, where the electrode comprises (a) an ion exchange material 75 (b) a plurality of particles 14 supporting a peroxide decomposition catalyst, and (c) a compound comprising phosphorus that binds said peroxide decomposition catalyst to said particles. In this embodiment it is understood that the electrode 70 can either be used as an anode or a cathode in a SPEFC. It will include appropriate catalysts 71 known in the art for fuel oxidation and oxygen reduction, respectively. These may include, but are not limited to precious metals such as supported or unsupported Pt and/or Pt alloys and the like, such as those described above for 61 and 62 of FIG. 6. The ion exchange material 72 may include, but is not limited to compositions comprising phenol sulfonic acid; polystyrene sulfonic acid; fluorinated-styrene sulfonic acid; perfluorinated sulfonic acid; sulfonated Poly(aryl ether ketones); polymers comprising phthalazinone and a phenol group, and at least one sulfonated aromatic compound; aromatic ethers, imides, aromatic imides, hydrocarbon, or perfluorinated polymers in which ionic an acid functional group or groups is attached to the polymer backbone. Such ionic acid functional groups may include, but are not limited to, sulfonic, sulfonimide or phosphonic acid groups. Particles 14 may include all the embodiments described above in reference to FIGS. 1-4. As is well known in the art, the electrode 70 will preferably be porous (not shown in FIG. 7) to allow appropriate fluid ingress and egress from the electrode.

The electrodes in this embodiment of the invention may utilize the same supports for the catalyst that are described above. A preferable support is carbon. The compound binding the catalyst to the particles, and the peroxide decomposition catalyst may also utilize the same materials as those described above.

The electrodes of this embodiment may be utilized in one or both of the electrodes in a catalyst coated membrane 86, which may in turn be used in a fuel cell 83 utilizing a solid polymer electrolyte 80 of any composition known the art. Such a fuel cell may optionally include appropriate gas diffusion media 84 and 85 as necessary to facilitate distribution of oxidizing and fuel fluids, respectively.

The following test procedures were employed on samples which were prepared in accordance with the teachings of the present invention.

Test Procedures

Catalyst Coated Membrane Preparation

Various inventive and other solid polymer electrolytes were prepared as described more fully below. When a catalyst coated membrane was needed from any of these, it was prepared by placing it between two PRIMEA® 5510 electrodes (available from Japan Gore-Tex, Inc., Tokyo, Japan) with 0.4 mg Pt/cm$^2$ loading in the each electrode. This sandwich was placed between platens of a hydraulic press (PHI Inc, Model B-257H-3-MI-X20) with heated platens. The top platen was heated to 160 degrees C. A piece of 0.25" thick GR® sheet (available from W. L. Gore & Associates, Elkton, Md.) was placed between each platen and the electrode. 15 tons of pressure was applied for 3 minutes to the system to bond the electrodes to the membrane. The resulting catalyst coated membrane was assembled into a fuel cell as described below for subsequent testing.

Cell Hardware and Assembly

For all examples, standard hardware with a 23.04 cm$^2$ active area was used for membrane electrode assembly (MEA) performance and durability evaluation. This hardware is henceforth referred to as "standard hardware" in the rest of this application. The standard hardware consisted of graphite blocks with triple channel serpentine flow fields on both the anode and cathode sides. The path length is 5 cm and the groove dimensions are 0.70 mm wide by 0.84 mm deep.

Two different cell assembly procedures were used. In the first procedure, designated as procedure No. 1, was used in the evaluation of membrane chemical durability by an open-circuit-voltage (OCV) hold method, which is described as Test Procedure 1. In this cell assembly procedure, the gas diffusion media (GDM) used was a microporous layer of Carbel® MP 30Z placed on top of a Carbel® CL gas diffusion layer (GDM), both available from W. L. Gore & Associates, Elkton, Md. Cells were assembled with two 20 mil UNIVERSAL® ePTFE gaskets from W. L. Gore & Associates, having a square window of 5.0 cm×5.0 cm, (available from Tekra Corp., Charlotte, N.C.) and two 1.0 mil polyethylene naphthalate (PEN) films hereafter referred to as the sub-gasket. The sub-gasket had an open window of 4.8×4.8 cm on both the anode and cathode sides, resulting in a MEA active area of 23.04 cm$^2$.

The second procedure, designated as procedure No. 2, was used to assemble the cells for accessing power density performance of the MEA, which is described as Test Procedure 2. In this assembly procedure, assembly materials were the same as procedure No. 1, with the exceptions that the GDM used was SIGRACET® GDL 25 BC (SGL Carbon Group, Germany), and gaskets were two 10 mil UNIVERSAL® ePTFE gaskets.

All the cells were built using spring-washers on the tightened bolts to maintain a fixed load on the cell during operation. They are referred to as spring-loaded cells. The assembly procedure for the cells was as follows:

1. The 25 cm$^2$ triple serpentine channel design flow field (provided by Fuel Cell Technologies, Inc, Albuquerque, N. Mex.) was placed on a workbench;
2. One piece of ePTFE gasket was placed on the anode side of the flow field;
3. One set of the GDM was placed inside the gasket so that the MP-30Z layer was facing up;
4. The window-shaped sub-gasket of PEN sub-gasket sized so it slightly overlapped the GDM on all sides was placed on top of the GDM;
5. The anode/membrane/cathode system was placed on top of the sub-gasket with anode-side down;
6. Steps (2) through (4) were repeated in reverse order to form the cathode compartment. The gasket used on the cathode side was the same as that used on the anode side.
7. There are total of eight bolts used in each cell, all bolts had spring washers, Belleville disc springs, purchased from MSC Industrial Supply Co. (Cat#8777849). The bolts were then tightened to a fixed distance that previously had been established to provide a targeted compressive pressure in the active area. For assembly procedure No. 1, and No. 2, the compressive pressure was targeted at 120 and 200 psi, respectively. Compression pressure was often confirmed by using Pressurex® Super Low Film pressure paper from Sensor Products, Inc., East Hanover, N.J.

Fuel Cell Testing

Chemical durability and power density performance of various MEAs were evaluated. A 95° C. OCV hold condition was developed to evaluate membrane's chemical durability, and a 110° C. beginning-of-life (BOL) polarization curve was used to access membrane's power density performance under automotive operation conditions. These protocols, identified as Test Protocol 1 and Test Protocol 2, are described more fully below.

Test Protocol 1

Materials to be tested were prepared as outlined below in the examples, and then assembled into a cell using the procedure outlined above. The cell was connected to a test station, conditioned, and then the test was started under test temperature and pressure as outlined below. The assembled cells were tested in fuel cell test stations with GlobeTech gas units 3-1-5-INJ-PT-EWM (GlobeTech, Inc., Albuquerque, N. Mex.), and Scribner load units 890B (Scribner Associates, Southern Pines, N.C.). The humidification bottles in these stations were replaced by bottles purchased from Electrochem Corporation (Woburn, Mass.). The humidity during testing was carefully controlled by maintaining the bottle temperatures, and by heating all inlet lines between the station and the cell to four degrees higher than the bottle temperatures to prevent any condensation in the lines. In all cases the inlet and/or outlet relative humidity of the anode and/or cathode was measured independently using dew point probes from Vaisala (Vantaa, Finland) to ensure the input hydrogen and air were humidified to desired relative humidity (RH) at the testing temperatures.

The cells were first conditioned at a cell temperature 80° C. with 100% relative humidity inlet gases on both the anode and cathode. The outlet gas pressure of both sides was controlled to be 25 psig. The gas applied to the anode was laboratory grade hydrogen supplied at a flow rate of 1.3 times greater than what is needed to maintain the rate of hydrogen conversion in the cell as determined by the current in the cell (i.e., 1.3 times stoichiometry). Filtered, compressed and dried air was supplied to the cathode humidification bottle at a flow rate of 2.0 times stoichiometry.

The cells were conditioned for 2 hours. The conditioning process involved cycling the cell at 80° C. between a set potential of 600 mV for 30 seconds, 300 mV for 30 seconds and open-circuit for 5 seconds for 2 hours.

After the above procedure, the cells were set to the life-test conditions. This time was considered to be the start of the life test, i.e., time equal to zero for all life determinations. Specific test conditions in this protocol were (Table 1): cell temperature of 95° C., 50% RH for both hydrogen and air, with a minimum flow rate of 100 and 200 cc/min, respectively. Outlet pressure was 25 psig in all cases. Cell potential was left to be at OCV throughout the life test.

Chemical Degradation Rate

For all the tests the amount of fluoride ions released into the product water was monitored as a means to evaluate chemical degradation rate. This is a well-known technique to establish degradation of fuel cell materials that contain perfluorosulfonic acid ionomers. Product water of fuel cell reactions was collected at the exhaust ports throughout the tests using PTFE coated stainless steel containers. Fluoride concentration in the concentrated water was determined using an F⁻-specific electrode (ORION® 960900 by Orion Research, Inc.). Fluoride release rate in terms of grams $F^-/cm^2$-hr was then calculated. The numbers reported herein are the calculated average fluoride release rate over the first 400 hours of testing, or over the life of the test if the test was stopped before 400 hours.

Membrane Life Measurement

The life of the membrane was established by determining the presence of flaws in the membrane that allow hydrogen to cross through it. In this application, this so-called hydrogen cross-over measurement was made using a flow test that measures hydrogen flow across the membrane. The membrane integrity was first evaluated during testing using an OCV decay measurement performed at ambient pressures. In Test Protocol 1, this measurement was carried out while the cell remained as close as possible to the actual life test condition. This ambient OCV decay test was performed periodically as indicated by the performance of the cell. Typically, it was performed, the first time, within 24 hours of initiation of the life test to establish initial base-line of membrane's integrity. After the initial test, this procedure was performed less frequently near the beginning of cell life (e.g., once a week), and more frequently the longer the cell operated (e.g., as often as once per day toward the end of life). Details of the measurement were as follows:

1. The outlet pressure of anode and cathode side was reduced to ambient;
2. The anode gas flow was increased to 800 cc/min and the anode outlet pressure was increased to 2 psi above ambient pressure; meanwhile, cathode air flow was set to be 0, and outlet flow of the cathode side was shut off by a valve;
3. The OCV value was recorded every second for 180 seconds;
4. The decay in the OCV during this measurement was examined. If this decay was significantly higher than previously observed, e.g., when the open circuit voltage value decayed to less than 250 mV in less than 30 seconds, a physical flow check was initiated to determine if the membrane had failed;
5. If the decay was close to that of the previous measurement, the life testing was resumed. When a physical flow check was indicated, it was performed as follows:
6. The gas inlet on the cathode was disconnected from its gas supply and capped tightly. The cathode outlet was then connected to a flow meter (Agilent® Optiflow 420 by Shimadzu Scientific Instruments, Inc., Columbia, Md.). The anode inlet remained connected to the $H_2$ supply and anode outlet remained connected to the vent.
7. The anode gas flow was maintained at 800 cc/min, and the anode outlet pressure was increased at 2 psi above ambient pressure.
8. The amount of gas flow through the cathode outlet was measured using the flow meter.
9. A failure criterion of 2.5 cc/min was established, so that when the measured gas flow of $H_2$ was greater than this value, the membrane was identified as having failed.
10. If the criterion for failure was met the test was stopped, and the membrane life was recorded as the number of hours the cell had been under actual test conditions when it failed the physical flow check (>2.5 cc/min). If the criterion for failure was not met, the cell was returned to testing.

Test Protocol 2

Test Protocol 2 was developed to evaluate BOL performance of MEA under automotive conditions. In this protocol, the materials were prepared as described below in the examples, and assembled into cells as described above. The cells were then conditioned, and subsequently tested using the procedure outlined more fully below. The test stations used for this protocol were fuel cell test stations with Teledyne Medusa gas units Medusa RD-890B-1050/500125 (Teledyne Energy Systems, Hunt Valley, Md.), and Scribner load units 890B. The gas units were modified with additions of solenoid valves from Parker outside of the humidification bottles. These valves control directions of gas flow so that the cells can be tested in wet and dry cycles.

The conditioning procedure used in this protocol was the same as described in Test Protocol 1. After conditioning, a series of polarization curves were taken by controlling the applied current density beginning at OCV for 1.5 minutes and then stepping through the following currently density and times intervals: 10 $mA/cm^2$ for 1.5 minutes, 20 $mA/cm^2$ for 1.5 minutes, 35 $mA/cm^2$ for 1.5 minutes, 65 $mA/cm^2$ for 1.5 minutes, 100 $mA/cm^2$ for 1.5 minutes, 200 $mA/cm^2$ for 1.5 minutes, 400 $mA/cm^2$ for 1.5 minutes, 600 $mA/cm^2$ for 1.5 minutes, 800 $mA/cm^2$ for 1.5 minutes, 1000 $mA/cm^2$ for 1.5 minutes. Then the following potentials were applied in steps: 500 mV for 1.5 minutes, 450 mV for 1.5 minutes, 400 mV for 1.5 minutes, 350 mV for 1.5 minutes, 300 mV for 1.5 minutes, 250 mV for 1.5 minutes, 200 mV for 1.5 minutes, recording the steady state current density at every step. Then, the steady state current density was recorded while stepping the voltage in reverse, i.e. 200 mV for 1.5 min, 250 mV for 1.5 min. etc. The average of the two steady state currents at each potential was used as the reported value.

Specific operation conditions for the polarization curve are summarized Table 1.

TABLE 1

Operation Conditions for Test Protocols 1 and 2

| Protocol No. | Cell Temp. (° C.) | Cell Potential (V) | Gas Type (anode/cathode) | Inlet Dew Point (° C.) (anode/cathode) | Minimum Gas Flow (anode/cathode) (cc/min) | Gas Stoic. (anode/cathode) | Outlet Pressure (anode/cathode) (psig) |
|---|---|---|---|---|---|---|---|
| 1 | 95 | Open Circuit voltage | $H_2$/Air | 50/50 | 100/200 | N/A | 25/25 |
| 2 | 110 | Variable | $H_2$/Air | 80/80 | 100/200 | 1.3/2.0 | 7/7 |

EXAMPLES

In the examples below, the ion exchange material used to prepare solid polymer electrolytes was prepared according to the teachings of Wu, et. al in U.S. Patent Application 2003/0146148, Example 5 except the reactants were adjusted to produce a product with equivalent weight of about 920.

This polymer had a melt flow index (MFI) that was typically 6±2 g/10 min with a range between 2 and 12. The MFI was measured by placing a 2160 gram weight onto a piston on a 0.8 cm long die with a 0.20955 cm orifice, into which 3-5 grams of as-produced polymer had been placed. Three separate measurements of the weight of polymer that flowed through the orifice in 10 minutes at 150° C. was recorded. The MFI in g/10 min was calculated as the average weight from the three measurements times 3.333. To make the ion exchange material more stable, this product was treated with 500 kPa of a 20% fluorine/80% nitrogen gas mixture at 70° C. for two six hour cycles. The polymer was subsequently extruded, pelletized and acidified using procedures standard in the art. Then it was made into a dispersion by forming a solution of 20%-30% of the acid form of the polymer, 10-20% deionized water, and balance alcohol in a glass-lined pressure vessel. The vessel was sealed, and the temperature was raised to 140° C. at a rate slow enough to maintain the pressure at less than 125 psi. It was held at 140° C. and about 125 psi for 2.5 hours. Then, a final solution was obtained by adding sufficient water to produce a solution the desired water percentage. This ionomer will be referred to herein as Type 1 ionomer.

For those examples below where an expanded polytetrafluoroethylene (ePTFE) membrane was used it was prepared using the teachings of Hobson et. al. in U.S. Pat. No. 6,613,203. A membrane similar to the Type 2 ePTFE in Hobson was prepared except the processing parameters were adjusted so the mass per area was 6.5±1.5 g/m2, the thickness was between 15 and 25 microns, the longitudinal matrix tensile strength was about 267 MPa (38,725 psi), the transverse matrix tensile strength was about 282 MPa (40,900 psi), the Gurley number was between 8 and 12 seconds, and the aspect ratio was about 29.

Example 1

A Ce containing peroxide decomposition catalyst bound to carbon using polyvinylphosphonic acid (PVPA) was prepared as follows, Ketjen Black carbon powder [1.7779 g] that had been previously oven dried and equilibrated to room conditions was placed in a beaker and impregnated with a solution consisting of 7.00 g of a commercial 30% polyvinylphosphonic acid solution plus 2.3 g water. After extensive mixing with a spatula, the solid sample was placed in a muffle furnace and heated in air to 170-200° C. for over 20 minutes, cooled and equilibrated to room conditions, yielding 3.88 g.

3.77 g of this material was slurried in a solution consisting of Ce(III)(NO3)3.6H2O [1.2556 g] dissolved into 20 mL of water and stirred for about 1 hour. The solid was then filtered under vacuum, washed 2 times with water, 1 time with acetone, 2 more times with water, and finally with acetone and dried in air. The sample then was placed in a muffle furnace and heated in air to 170° C. for 20 minutes followed by cooling, homogenization, and storing in a vial.

Example 2

A Ce containing peroxide decomposition catalyst bound to carbon using polyvinylphosphonic acid (PVPA) was prepared as follows. 3.56 grams of Ketjen black carbon EC300J which had been dried in an oven overnight at 80 degrees centigrade at a vacuum of 4.3 inches of mercury, then allowed to cool in a covered container, was placed in a beaker. To it was added 14.00 grams of polyvinyl phosphonic acid (Diversitec PVPA-UP, 30.8% in water). The mix was stirred with a glass stirring rod until uniform. To this was added 5.03-g of deionized water and that was again stirred until uniform. The beaker containing the mix was placed in a vacuum oven and baked at 198+/−2 degrees C. for two hours with slow nitrogen purge. The oven was then evacuated to 1.8 inches of mercury with continuing purge.

The resulting slightly agglomerated black powder which weighed 7.5-g was transferred to a 150-ml beaker and 60-ml of 3N nitric acid was added. The mix was heated to approximately 60 degrees centigrade with stirring by a magnetic stir bar. At the end of 30 minutes this mix was filtered using #1 Whatman filter paper and a vacuum flask. The filtrate was rinsed four times with 50-ml of deionized water.

This process was repeated twice more. The final filtrate was baked to dryness for 2.5-hrs at 4.4 inches of mercury vacuum. The resulting black powder weighed 6.3-g.

All of this powder was combined with a solution made up of 2.55 grams of Ce (NO$_3$)$_3$.6H$_2$O dissolved in 50-ml of distilled water.

This mix was stirred in a beaker on a hot plate at between 60 and 70 degrees centigrade for 90 minutes. The mix was then filtered as before and rinsed three times with 75-ml deionized water. The resulting material was dried at 80 degrees for 2 hours. The result was a black powder weighing 7.45 grams.

X-ray diffraction was performed using a Shimadzu Lab X, XRD-6000 after gently grinding the powder. The results show no distinct crystalline peaks, but two broad diffuse peaks at ~24 and 42 degrees, consistent with a material that is mostly amorphous, or non-crystalline.

Example 3

A Mn containing peroxide decomposition catalyst bound to carbon using p polyvinylphosphonic acid (PVPA) was prepared using the same procedure described in Example 2, except Mn(NO$_3$)$_3$.6H$_2$O was substituted for the Ce (NO$_3$)$_3$.6H$_2$O.

(Separately from this Example 3, the inventors also produced catalysts with PVPA and other metals by separately substituting each of the following for the Ce (NO$_3$)$_3$.6H$_2$O of Example 2: Tb(NO3)3.6H2O, Sa(NO3)3.6H2O, Nd(NO3)3.6H2O, Pr(NO3)3.6H2O, and La(NO3)3.6H2O. This produced catalysts containing Mn, Tb, Sa, Nd, Pr, and La, respectively.)

Example 4

A Ce compound without a support was prepared as follows. To 11 grams of 32.2% PVPA in water was added an aqueous solution of 8.95 grams of Cerium (III) nitrate hexahydrate slowly with stirring. The resulting precipitate was stirred at approximately 60 degrees centigrade for one hour then collected on filter paper. The filter cake was removed from the paper and stirred with approximately 70-g of deionized water for five minutes. This process was repeated four times. The final white solid was dried four hours at 80 degrees centigrade and 4.5 inches of mercury. The final product consisted of 6.3 grams of free flowing fine white powder. X-ray diffraction was performed using a Shimadzu Lab X, XRD-6000 after gently grinding the powder. The results show no distinct crystalline peaks, but one broad diffuse peak at ~21 degrees, consistent with a material that is mostly amorphous, or non-crystalline.

Example 5

In this example, a composite membrane was prepared using the inventive peroxide decomposition catalysts as a component. An ink was prepared using ~2.5 g of the powder prepared in Example 1, 50 g of type 1 ionomer with 10% solids, 10% water and the balance ethanol, and an additional 47 g of ethanol. This solution was passed through a rotor/stator agitator mixer, Model AX200 by Silverson Machines Inc., Longmeadow, Mass., hereinafter referred to as a Silverson.) for 15 minutes at 10,000 rpm, followed by three times through a Model M-700 Microfluidizer from Microfluidics, Newton, Mass. (hereinafter referred to as a microfluidizer) at 12,000 to 15,000 psi. Then, a solution containing 27% Type 1 ionomer solids, 15% water and that balance ethanol was prepared and cast onto a fluoropolymer treated polyethylene terephthalate (PET) film using a #40 meyer bar. Expanded PTFE was stretched over the coating while it was still wet to effect imbibing. This "first pass" was then dried with a hair dryer. A second solution was prepared by mixing 3.265 g of the ink described above with 30 g of 10% Type 1 ionomer solids in 10% water with the balance ethanol. This solution was then cast onto the dried first pass membrane using a 7 mil draw down blade. After this "second pass", the membrane was dried with a hair dryer, removed from the backer, stretched over a glass dish, and annealed at 160 C for 3 minutes. The thickness was approximately 18 microns. (This produces a maximum theoretical amount, assuming no loss of cerium in processing, of 0.086 grams cerium per 100 grams of dry ionomer, i.e., 0.086% Ce per dry ionomer.) Subsequently, a CCM was assembled as described above so that the side containing the peroxide decomposition catalyst was toward the cathode. The CCM was tested using Test Protocol 1. Testing results are summarized in Table 4.

Example 6

In this example the same materials and procedures used in Example 5 was used, except the first pass and second pass solutions were the same. This casting solution was prepared by adding 7.99 g of the initial ink prepared in Example 5 to 39.982 g of 22% Type 1 ionomer, 20% water and balance ethanol. The first pass was performed with a 7 mill draw down blade, and the second pass was performed with a 4 mil draw down blade. The final thickness of the membrane was approximately 20 microns. (This produces a maximum theoretical amount, assuming no loss of cerium in processing, of 0.22 grams cerium per 100 grams of dry ionomer, i.e., 0.22% Ce per dry ionomer.) Subsequently, an CCM was assembled as described above. The CCM was tested using Test Protocol 1. Testing results are summarized in Table 4. This sample thus had approximately twice the amount Ce compound as the previous example.

Example 7

In this example, a membrane with a different concentration of Ce compound was prepared. First, an ink was prepared by adding 1.0945 grams of the material prepared in Example 2 above to 8.9905 grams of an ionomer dispersion consisting of 20.6% solids in deionized water with and additional 7.4807 grams of deionized water. This mix was placed in a vial and dispersed using the Silverson at 10,000 rpm for 25-minutes. The resulting dispersion was placed in the original vial onto a magnetic stirrer and a small PTFE coated stir bar was added. The dispersion was stirred slowly for several hours or overnight to remove bubbles resulting from the high shear dispersion.

The resulting mix was diluted 2:1 with deionized water and stirred. A 6.5 gram aliquot of the diluted mix was then combined with 30 grams of 22% BD ionomer and mixed again. This solution was used to prepare a membrane as described in Example 5 except a 6 mil draw down blade was used in the first pass, and a 4 mil draw bar was used in the second pass. The final thickness of the membrane was approximately 20 microns. (This produces a maximum theoretical amount, assuming no loss of cerium in processing, of 0.18 grams cerium per 100 grams of dry ionomer, i.e., 0.18% Ce per dry ionomer.) Subsequently, a CCM was assembled as described above. The CCM was tested using Test Protocol 1. Testing results are summarized in Table 4. The results show the fluoride release rate (FRR) is lower than a state-of-the-art commercial product (Comparative Example C2), and the performance in BOL is nearly identical.

Example 8

In this example, a composite membrane was prepared using the inventive peroxide decomposition catalysts as a component. 0.59 grams of the material prepared in Example 3 that was hot-acid washed using the same procedure as described in Example 2 was combined with 3.55 grams of an ionomer dispersion consisting of 20.6% solids in deionized water and with and additional 2.95 grams of deionized water. This mix was placed in a vial and dispersed using a rotor stator agitator (Model AX200 by Silverson Machines Inc., Longmeadow, Mass.) running at 10,000 rpm for 25-minutes. The resulting dispersion was mixed with 28.94 grams of BD ionomer at 26.92 percent solids using the rotor stator agitator mixer as before. This solution was cast onto a fluoropolymer treated polyethylene terephthalate (PET) film using a 5 mil draw down bar. Expanded PTFE was stretched over the coating while it was still wet to effect imbibing. This "first pass" was then dried with a hair dryer. The same solution then cast onto the dried first pass membrane using a 3 mil draw down blade. After this "second pass", the membrane was dried with a hair dryer, removed from the backer, stretched over a glass dish, and annealed at 160 C for 3 minutes. The thickness was approximately 20 microns, (This produces a maximum theoretical amount, assuming no loss of cerium in processing, of 0.75 grams manganese per 100 grams of dry ionomer, i.e., 0.75% Mn per dry ionomer.) Subsequently, a CCM was assembled as described above. The CCM was tested using Test Protocol 1. Testing results are summarized in Table 4.

Example 9

In this example, the inventive composition was used as a component in an electrode for application in a fuel cell. An ink was prepared by using ~2.5 g of the powder prepared in Example 1, 50 g of type 1 ionomer with 10% solids, 10% water and the balance ethanol, and an additional 47 g of ethanol. This solution was passed through a rotor stator agitator (Model AX200 by Silverson Machines Inc., Longmeadow, Mass.) for 15 minutes at 10,000 rpm, and then three times through microfluidizer at 12,000-15,000 psi.

Separately, a concentrated catalyst ink consisting of platinum on a carbon support was prepared as follows: 7.46 g of Pt/C catalyst (type SA50BK, N. E. Chemcat, Inc., Tokyo, Japan) was mixed with 0.85 g ethanol, 86.09 g terbutanol, and 80.62 g of Flemion ionomer of equivalent weight of 950 (Asahi Glass, Co. Ltd., Tokyo, Japan) in a 2 liter glass vessel. The vessel was evacuated and filled with nitrogen 3 times, then opened and mixed with a stainless steel spatula, and transferred to a 200 ml bottle. Then it was mixed with the Silverson agitator for 30 minutes at 10,000 rpm.

A final ink was prepared by adding 8.1 g of the ink containing the inventive compound to 45 g of the Pt/C/ionomer ink. This solution was cast onto an ePTFE membrane using a draw down blade and dried with a hair drier. The final electrode had approximately 0.12 g/cm² Pt. It was subsequently prepared into a CCM and tested using the procedures outlined in Test Protocol 1 except the break-in occurred for 4 hours instead of 2 hours. The average fluoride release rate after ~400 hours of testing was $4.78 \times 10^{-7}$ g/cm²/hr.

Comparative Example C1

A GORE-SELECT® membrane Series 5700 (W. L. Gore & Associates, Eklton Md.) was used to assemble a CCM as described above. The CCM was tested using Test Protocol 1. The fluoride release rates were higher than the inventive examples.

Comparative Example C2

A GORE-SELECT® membrane Series 5720 (W. L. Gore & Associates, Eklton Md.) was used to assemble a CCM as described above. The CCM was tested using Test protocol 1 and 2. The fluoride release rates were higher than the inventive examples (Table 4).

Comparative Example C3

In this example, an insoluble Cerium compound is added to a membrane in a concentration range roughly comparable to the inventive materials. Cerium oxide was added to a solution containing 20% Type 1 solids, 20% water, balance ethanol in order to reach approximately 0.02 wt. % Ce. This solution was cast onto a fluoropolymer treated polyethylene terephthalate (PET) film using 7.5 mil draw down blade. Expanded PTFE was stretched over the coating while it was still wet to effect imbibing. This "first pass" was then dried with a hair dryer. The same solution then cast onto the dried first pass membrane using 4.5 mil draw down blade. After this "second pass", the membrane was dried with a hair dryer, removed from the backer, stretched over a glass dish, and annealed at 160 C for 3 minutes. The thickness was approximately 21 microns. Subsequently, a CCM was assembled as described above. The CCM was tested using Test Protocol 1. Testing results are summarized in Table 4. Unlike the inventive materials, the soluble Ce in this comparative example is mobile in the membrane, and may even wash out of the cell completely in very aggressive conditions.

Comparative Example C4

In this example, a soluble Cerium compound is added to a membrane in a concentration range roughly comparable to the inventive materials. $Ce(NO_3)_3 \cdot 6H_2O$ was added to a solution containing 20% Type 1 solids, 20% water, balance ethanol in order to reach approximately 0.12 wt. % Ce. This solution was cast onto a fluoropolymer treated polyethylene terepthalate (PET) film using 8 mil draw down blade. Expanded PTFE was stretched over the coating while it was still wet to effect imbibing. This "first pass" was then dried with a hair dryer. The same solution then cast onto the dried first pass membrane using 5 mil draw down blade. After this "second pass", the membrane was dried with a hair dryer, removed from the backer, stretched over a glass dish, and annealed at 160 C for 3 minutes. The thickness was approximately 20 microns. Subsequently, a CCM was assembled as described above. The CCM was tested using Test Protocol 1. Testing results are summarized in Table 4. The results show fluoride release rates higher than the inventive materials, and again, unlike the inventive materials, the soluble Ce in this comparative example is mobile in the membrane, and may even wash out of the cell completely in very aggressive conditions.

TABLE 4

Results

| | | Test Protocol 1 Results | | Test Protocol 2 | |
| --- | --- | --- | --- | --- | --- |
| Example | # of tests | Life Time (hr) | Ave. FRR* (g/cm² · hr) | # of Tests | Ave. V at 800 ma/cm² |
| 5 | 1 | >810 | 1.76E−08 | — | — |
| 6 | 1 | >740 | 3.28E−08 | — | — |
| 7 | 1 | >810 | 1.33E−08 | 6 | 0.568 |
| 8 | 2 | >501 | 1.08E−08 | — | — |
| C1 | 1 | 212 | 4.02E−06 | — | — |
| C2 | 2 | >433 | 1.06E−07 | 2 | 0.565 |
| C3 | 1 | >432 | 1.26E−07 | — | — |
| C4 | 2 | >427 | 4.34E−08 | — | — |

*Fluoride Release Rate, calculated as described above.

As can be seen from the results presented in Table 4, the inventive examples all provided dramatically better (lower) fluoride release rates, up to two orders of magnitude better than the comparative examples.

What is claimed is:

1. A solid polymer electrolyte membrane comprising (a) an ion exchange material and (b) dispersed in said ion exchange material, a hydrogen peroxide decomposition catalyst bound to a carbon particle support, wherein the hydrogen peroxide decomposition catalyst comprises (i) polyvinylphosphonic acid and (ii) cerium.

2. The solid polymer electrolyte membrane of claim 1 wherein said solid polymer electrolyte membrane further comprises expanded polytetrafluoroethylene having a porous microstructure of polymeric fibrils, and said ion exchange material impregnated throughout the porous microstructure of the expanded PTFE membrane so as to render an interior volume of the expanded PTFE membrane substantially occlusive.

3. The solid polymer electrolyte membrane of claim 2 wherein said solid polymer electrolyte membrane comprises a first layer comprising (a) at least one expanded PTFE membrane having a porous microstructure of polymeric fibrils, and (b) at least one ion exchange material impregnated throughout the porous microstructure of the expanded PTFE membrane so as to render an interior volume of the expanded PTFE membrane substantially occlusive, and a second layer comprising ion exchange material in the absence of an expanded PTFE membrane.

4. The solid polymer electrolyte membrane of claim 3 wherein said second layer comprises said peroxide decomposition catalyst.

* * * * *

UNITED STATES PATENT AND TRADEMARK OFFICE
CERTIFICATE OF CORRECTION

PATENT NO. : 7,989,115 B2  
APPLICATION NO. : 11/956819  
DATED : August 2, 2011  
INVENTOR(S) : Vincent A. Durante et al.

Page 1 of 1

It is certified that error appears in the above-identified patent and that said Letters Patent is hereby corrected as shown below:

At column 7, line 56: change "5.000" to "5,000";

At column 16, line 33: delete "p" before polyvinylphosphonic; and

At column 18, line 23: Change "and" to "an".

Signed and Sealed this
Eighteenth Day of October, 2011

David J. Kappos
*Director of the United States Patent and Trademark Office*